United States Patent [19]

Wurzburger et al.

[11] Patent Number: 5,891,320
[45] Date of Patent: Apr. 6, 1999

[54] SOLUBLE MAGNESIUM HYDROXIDE

[76] Inventors: Stephen R. Wurzburger, P.O. Box C, Goodyear Bar, Calif. 95944; James M. Overton, 1127 Nickel La., Yuba City, Calif. 95911

[21] Appl. No.: 701,777

[22] Filed: Aug. 26, 1996

Related U.S. Application Data

[63] Continuation-in-part of Ser. No. 613,606, Mar. 11, 1996, Pat. No. 5,698,107.

[51] Int. Cl.$^6$ .................. C25B 1/20; C01F 1/00; C01F 5/40; C01F 11/46
[52] U.S. Cl. ............... 205/508; 205/538; 423/164; 423/166; 423/555; 423/638
[58] Field of Search ................. 205/538, 508; 252/79.5, 79.2; 134/3; 423/164, 166, 555, 638

[56] References Cited

U.S. PATENT DOCUMENTS

| | | | |
|---|---|---|---|
| 3,705,090 | 12/1972 | Bergeron et al. | 205/508 X |
| 3,785,943 | 1/1974 | Eberle et al. | 205/508 |
| 4,670,114 | 6/1987 | Beer et al. | 205/508 X |
| 4,917,724 | 4/1990 | Sharma | 252/62.55 X |
| 5,384,017 | 1/1995 | Lumbroso | 205/508 X |

*Primary Examiner*—Donald R. Valentine
*Attorney, Agent, or Firm*—Robert Samuel Smith

[57] ABSTRACT

A clear solution and a method for preparing the solution which has a pH in the range of from 10 to 13.9 and containing sulfate ions in a concentration range less than 500 parts per million. The solution is prepared by mixing two solutions in which one solution has one equivalent of magnesium sulfate and an equivalent of sulfuric acid and the second solution has an equivalent of Ca $(OH)_2$ and two equivalents of $K_2OH$. It is believed that $CaSO_4$ precipitates in the mixed solution and causes coprecipitation of potassium, perhaps as double salt with the Ca leaving OH stabilized by hydration and magnesium ions.

8 Claims, 1 Drawing Sheet

MIX $H_2SO_4$ AND $MgSO_4 * 7H_2O$ = SOLUTION 1

MIX $K_2OH$ AND $CaOH$ = SOLUTION 2

MIX SOLUTION 1 AND SOLUTION 2 = RESULTANT

FILTER RESULTANT SOLUTION

MIX H$_2$SO$_4$ AND MgSO$_4$*7H$_2$O = SOLUTION 1

MIX K$_2$OH AND CaOH = SOLUTION 2

MIX SOLUTION 1 AND SOLUTION 2 = RESULTANT

FILTER RESULTANT SOLUTION

FIG. 1

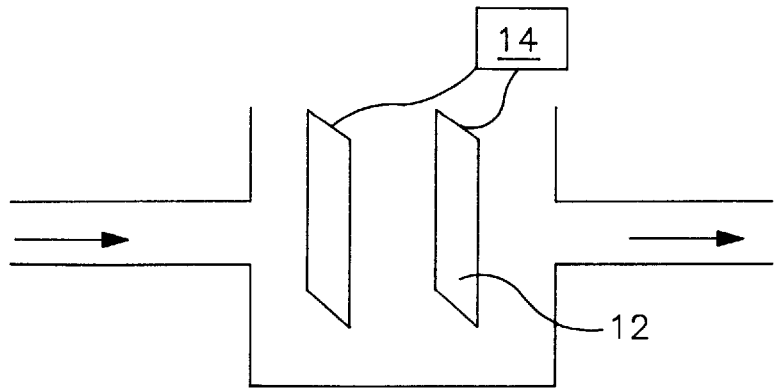

FIG. 2

MIX H$_2$SO$_4$ AND MgSO$_4$*7H$_2$O = SOLUTION 1

MIX K$_2$OH AND CaOH = SOLUTION 2

MIX SOLUTION 1 AND SOLUTION 2 = RESULTANT

FILTER RESULTANT SOLUTION

GENERATE WASTE SOLUTION

PASS WASTE SOLUTION BETWEEN ELECTRODES

FILTERING SAID WASTE SOLUTION

FIG. 3

SOLUBLE MAGNESIUM HYDROXIDE

CROSS REFERENCE TO EARLIER FILED APPLICATIONS

This application is a continuation-in-part of application Ser. No. 08/613,606 filed Mar. 11, 1996 now U.S. Pat. No. 5,698,107 and for which priority is claimed.

FIELD OF THE INVENTION

This invention relates to methods of making aqueous magnesium hydroxide solutions and particularly to a solution that is clear of the magnesia sludge that characterizes typical industrial aqueous magnesia solutons.

PRIOR ART AND INFORMATION DISCLOSURE

Standard magnesium hyroxide is manufactured by crushing an ore containing magnesium carbonate and calcium carbonate and putting the ore through a kiln in order to drive off $CO_2$ leaving magnesium oxide (MgO) and calcium oxide (CaO).

Numerous chemical processes include steps that require strong base solutions with a high pH. Such processes include, for example, paint stripping operations where it is desirable to loosen and remove an old coating on a steel or cast iron surface down to the bare metal in order to repaint or replate the metal surface. Another group of processes relates to the cleaning of an aluminum surface in which it is required to remove aluminum oxide scale as an initial step in the typical anodizing or alodining process. Extreme care must sometimes be taken in these preliminary steps to prevent etching of the base metal (aluminum) that can damage the metal part.

Generally, solutions including sodium hydroxide (caustic solutions) are used for these operations. The use of sodium hydroxide has the advantage that the salt is very highly soluble and is the agent for obtaining the very high pH necessary to support the desired reaction with the coatings. Usually inhibitors are added to the caustic solution which coat the metal as soon as the offending coating of paint or oxide has been removed. The inhibitors protect the newly exposed surface from further attack by the caustic solution. However, the inhibiting agent, itself can become a problem since it must be removed from the virgin metal surface.

The use of sodium hydroxide in these processes has the advantages that the salt is very highly soluble and provides the means for obtaining the very high pH necessary to support the desired reaction with the coatings and/or underlying oxides. However, an important problem associated with using caustic solutions is the difficulty in removing the sodium ion from the spent (waste) solution. The only practical approach is by major dilution. The presence of sodium in drinking water is not desirable because its presence raises blood pressure.

Attempts have been made to substitute oxide compounds of calcium or magnesium for sodium in order to overcome the problems with sodium. However, such substitutions have not been successful because of the strong tendency of oxide compounds of magnesium and calcium to precipitate and form sludges. Removal of such sludges and the following step of dewatering the sludge has proven to be too expensive for practical application. Furthermore, the pH at which such objectionable precipitation occurs is generally in the range of 9.0 to 10.0 which is appreciably lower than can be obtained with the caustic solutions or is actually required to precipitate and remove heavy metal constituents to a level that is acceptable according to present standards.

SUMMARY

In view of the these difficulties, it is an object of this invention to produce a basic solution in a range between pH=10 to pH=13.9 whose cation is primarily magnesium and which does not form a sludge upon standing.

It is a further object that the basic solution of this invention be non-reactive with human tissue and is much safer to handle than compounds containing Na and K intended for the same applications.

It is another object that the solution be inexpensive to produce and require no special equipment and that waste solutions of the invention be neutralized by electrical chemical processes rather than by the addition of acid neutralizing agents.

BRIEF DESCRIPTION OF THE FIGURES

FIG. 1 shows a flow chart for producing high pH solutions of magnesia.

FIG. 2 shows shows an apparatus for removing magnesium ions.

FIG. 3 shows the steps for using the solution in a process requiring high pH.

DESCRIPTION OF A BEST MODE

Turning now to a discussion of the drawings, FIG. 1 is a flow chart showing steps for producing the high pH magnesia solution of this invention.

In step 1, a first solution was formed by adding concentrated sulfuric acid containing one gram atomic weight of $H_2SO_4$ and one gram atomic weight of $Mg\ SO_4.7H_2O$ to two liters of deionized water and agitating so that the resulting $MgSO_4$ is completely dissolved after 30 mins. of mild agitation.

In step 2 a second solution was formed by completely dissolving one gram atomic weight of $Ca(OH)_2$ and two grams atomic weight of $K(OH)$ in two liters of deionized water and agitating for 30 mins.

In step 3, the first and second solutions were mixed together causing a precipitate to form.

In step 4, the solution was filtered through an 11 micron filter thereby producing a filtrate that is the solution of this invention.

The pH of the filtrate was measured and observed to be 13.7. The filtrate was examined in a spectrometer and found to contain 54 parts per million of $Ca^{++}$, less than 500 parts per million of $SO_4^{++}$. Any concentration of $K^+$ in the first-rate was below the limit of detection by the spectrometer.

By performing the steps in accordance with the method of the invention, a solution containing $Mg^{++}$ was formed stabilized by the presence of $OH^{--}$ such that the solution has a pH of about 13.7. Appropriate dilution of this solution can be used to reduce the solution to any value in the range from $7^+$ to at least 13.7.

In order to compare these results with what would normally be the most direct method of producing an aqueous solution of magnesium hydroxide, the following procedures were performed.

Procedure 1—100.0 grams of Premier Chemical Brucite 200 ($MgO*H_2O$) was added to 750 ml of deionized water, stirred for two hours, then allowed to set overnight. The solution was then filtered. The precipitate weighed 100.0 gms. indicating that most all of the $MgO*H_2O$ originally mixed into the water had settled out. The pH of the filtrate was 9.45.

Procedure 2— To 750 ml of water was added conc. $H_2SO_4$ such as to lower the pH to 3.0. To this sample was added 100.0 gms. of Brucite and mixed and allowed to stand overnight. The solution was filtered and the filtrate was dried. The filtrate was weighed and found to weigh 99.6 gms indicating that 0.4% of the original Brucite had dissolved.

Procedure 3.— To 750 ml of water was added conc. NaOH such as to raise the pH to 11.0. To this solution was added 100.0 gms. of Brucite, mixed and allowed to stand overnight. The solution was filtered and the filtrate dried and weighed. The filtrate was weighed and it was found that only 0.15% of the original magnesium compound had dissolved. The end pH was found to be 10.1, lower than the initial 11.0 of the NaOH solution in water.

Procedures 1, 2 and 3 demonstrate the difficulty in dissolving magnesium oxide compounds in water such as to obtain a clear solution with a pH greater than 9–10.

Although we do not wish to be bound by theory, it is believed that the results presented above are in accordance with the following discussion.

Magnesium Oxide is known to form a true hydroxide $Mg(OH)_2$ which is very soluble in water, and/or a hydrate, $MgO*H_2O$ which is relatively insoluble. Under the conditions prevailing in procedures 1, 2 and 3, which are general conditions that typify many industrial processes, insoluble $MgO*H_2O$ is the dominant species of magnesium hydroxde when the pH of the solution exceeds 10.0. so that additional amounts of added MgO simply result in forming $MgO*H_2O$ precipitate without further raising the pH.

Under the conditions prevailing according to step 2 of the invention, the hydrated hydroxide ions are formed and remain after the steps of adding the dissolved KOH and $Ca(OH)_2$ to the solution of $H_2SO_4$ and $MgSO_4$. $CaSO_4$ is insoluble in water and $KSO_4$ is soluble in water only to the extent of 10 gms/100 ml water. However, it is also known that potassium forms double sulfate salts with alkali earth metals and so it is reasoned that any $K^+$ that would otherwise remain in solution will coprecipitate with the precipitated $CaSO_4$, thereby explaining the absence of $K^+$ in the solution of this invention.

A major advantage for using the solution of this invention compared to state of the art processes using caustic solution to neutralize waste acid solutions is the ability to remove the magnesium ions from waste solutions using electrochemical means which is a method of this invention. FIG. 2 shows an apparatus for removing the magnesium ion. There is shown a pair of iron anodes 12 between which the spent solution containing magnesium ions is passed. A voltage from power supply 14 is applied between the electrodes in the range 79 to 83 volts. This step causes a precipitate of $Mg(OH)_3$ to form which is filtered out of the solution.

FIG. 3 lists the steps included in a typical process for applying the principles of this invention to situations where the magnesium containing solution is used such as in the neutralization of waste acid solutions or in cleaning operations whereafter the magnesium is removed.

In step 1, a first solution was formed by adding concentrated sulfuric acid containing one gram atomic weight of $H_2SO_4$ and one gram atomic weight of $Mg\ SO_4.7H_2O$ to two liters of deionized water and agitating so that that the resulting $MgSO_4$ is completely dissolved after 30 mins. of mild agitation.

In step 2 a second solution was formed by completely dissolving one gram atomic weight of $Ca(OH)_2$ and two grams atomic weight of K(OH) in two liters of deionized water and agitating for 30 mins.

In step 3, the first and second solutions are mixed together causing a precipitate to form.

In step 4, the solution was filtered through an 11 micron filter thereby producing the a filtrate that is the solution of this invention.

In step 5, the solution from step 4 is used in the intended operation which is typically a metal cleaning operation or acid neutralizing operation.

In step 6 the solution is passed between electrodes with a voltage in the range between 79 to 83 volts providing that magnesium precipitate forms and removing the magnesium ions from solution.

In step 7, the precipitate is filtered out of the solution.

Other concentrations of $H_2SO_4$, $Ca(OH)_2$, KOH, and $Mg\ SO_4$ have been investigated in the course of reducing this invention to practice which have produced solutions with characteristics similar to the above example and the use of this range of compositions is within the scope of the invention. These ranges are one quarter to three quarter gram atomic weight of $H_2SO_4$, $Ca(OH)_2$, $MgSO_4$ and one half to one gram atomic weight of K(OH) in a liter of water.

However, it is presently believed that the conditions listed in steps 1–4 are optimum for many situations.

The foregoing discussion discloses an example of the application of principles of the invention to produce a solution having a high pH and a heavy concentraion of magnesium ions. The solution is useful in processes such as cleaning or neutralization where it is desired to avoid the formation of sludge and be amenable to post treatment utilizing electrochemical techniques. The principles of the invention include adding a solution of a soluble salt of magnesium ($MgSO_4$) dissolved in an acid having an anion common with the salt to a solution of a strong base (KOH) and a base ($Ca(OH)_2$) in which the cation ($Ca^{++}$) and the anion of the soluble salt ($SO_4^{--}$) precipitate out of soltuion and pull the cation ($K^+$) of the strong base (KOH) out of solution by coprecipitation leaving, in solution, hydrated (stabilized) hydroxyl ions $(OH)*(H_2O)_n$ and $Mg^{++}$. Application of these principles thereby provides a solution having a much greater concentration of $Mg^{++}$ and a greater pH than has been disclosed by other related processes of the prior art. Other elements can be substituted in the process of this invention to which the same considerations can apply. For example, Barium ions form insoluble precipitates with the sulfate ion and could be a useful substitute for Calcium in some applications.

Other variations of the invention may be suggested after reading the specification that are within the scope of the invention. We therefore wish to define the scope of our invention by the appended claims.

What is claimed is:

1. A method for preparing a solution for processes requiring a pH greater than 9.0 which includes the steps in operable order:

(a) forming an aqueous first solution by adding a first amount of a soluble compound of magnesium and a first anion to a second amount of an acid in solution of said first anion wherein said first and second amounts are chemical equivalents and said first anion is selected to form a strong acid;

(b) forming an aqueous second solution by adding a third amount of a strong base and a fourth amount of a weak base to water wherein said fourth amount is the chemical equivalent of said first and second amounts and wherein a cation of said weak base is selected to combine with said first anion to form a precipitate and to cause a cation of said strong base to coprecipitate with said first cation when said first solution and said second solution are mixed together;

(c) mixing said first and second solutions together thereby causing said cation of said weak base to combine with said first anion to form said precipitate in a resultant solution and causing said cations of said strong base and said cations of said weak base to coprecipitate with said first anion leaving magnesium ions in solution.

(d) filtering said resultant solution such as to substantially remove all of said precipitate.

2. The method of claim 1 wherein step (b) includes the step of selecting said third amount of strong base such as to determine a pH of said resultant solution.

3. The method of claim 2 which includes the step after step (e) of:

(f) passing said resultant solution between a pair of electrodes having a voltage between said electrodes providing a precipitate of magnesium oxide is formed;

(g) filtering said resultant solution such as to substantially remove said precipitate.

4. The method of claim 2 wherein said step (a) includes the step:

forming said first solution by adding an amount of sulfuric acid and an equivalent amount of $Mg\ SO_4.7H_2O$ to deionized water and agitating so that the resulting $MgSO_4$ is completely dissolved; and step (b) includes the step:

forming said aqueous second solution by dissolving an amount of $Ca(OH)_2$ equivalent to said amount of sulfuric acid and two two equivalent amounts of $K(OH)$ in deionized water.

5. The method of claim 4 wherein said amount of sulfuric acid in water is in a range equivalent to a concentration between one quarter gram atom per liter of water and three quarter gram atoms per liter of water.

6. The method of claim 5 wherein said method is a process for cleaning a metal part and step (e) includes the step of immersing said part in said resultant solution.

7. The method of claim 5 wherein said method is a process for neutralizing a waste acid solution and said step (e) includes the step of adding said resultant solution to said waste acid solution.

8. The method of claim 1 wherein said step (b) includes the step of selecting said third amount to establish a select pH of said resultant solution.

* * * * *